US 8,842,750 B2

(12) United States Patent
Shukla et al.

(10) Patent No.: US 8,842,750 B2
(45) Date of Patent: Sep. 23, 2014

(54) CHANNEL ESTIMATION FOR DVB-T2 DEMODULATION USING AN ADAPTIVE PREDICTION TECHNIQUE

(75) Inventors: Parveen K. Shukla, Nottinghamshire (GB); Bernard Arambepola, Middlesex (GB); Thushara Hewavithana, Hertfordshire (GB); Sahan S. Gamage, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 12/974,582

(22) Filed: Dec. 21, 2010

(65) Prior Publication Data

US 2012/0155577 A1 Jun. 21, 2012

(51) Int. Cl.
- *H04L 27/28* (2006.01)
- *H04L 25/02* (2006.01)
- *H04L 27/26* (2006.01)

(52) U.S. Cl.
CPC .............. *H04L 25/022* (2013.01); *H04L 25/025* (2013.01); *H04L 25/0232* (2013.01); *H04L 27/2647* (2013.01)
USPC ............................ 375/260; 375/316; 375/350

(58) Field of Classification Search
CPC . H04L 25/024; H04L 25/025; H04L 25/0228; H04L 25/0232
USPC .................. 375/260, 316, 340, 350
See application file for complete search history.

(56) References Cited

U.S. PATENT DOCUMENTS

| | | | | |
|---|---|---|---|---|
| 6,098,161 A * | 8/2000 | Kim | .............................. | 711/220 |
| 2005/0003768 A1 * | 1/2005 | Laroia et al. | .................. | 455/101 |
| 2005/0265490 A1 * | 12/2005 | Sestok et al. | .................. | 375/340 |
| 2005/0286406 A1 * | 12/2005 | Jeon et al. | ...................... | 370/208 |
| 2006/0034163 A1 * | 2/2006 | Gore et al. | ...................... | 370/208 |
| 2006/0064725 A1 * | 3/2006 | Rabinowitz et al. | ............ | 725/68 |
| 2006/0227748 A1 * | 10/2006 | Stamoulis et al. | ............ | 370/332 |
| 2006/0269016 A1 * | 11/2006 | Long et al. | ..................... | 375/340 |
| 2007/0076804 A1 * | 4/2007 | Sestok et al. | .................. | 375/260 |
| 2007/0110020 A1 * | 5/2007 | Kroeger et al. | ............... | 370/343 |
| 2007/0206687 A1 * | 9/2007 | Ananth et al. | ................. | 375/260 |
| 2008/0084817 A1 * | 4/2008 | Beckman et al. | ............. | 370/210 |
| 2008/0089451 A1 * | 4/2008 | Taylor et al. | .................. | 375/346 |
| 2008/0240265 A1 * | 10/2008 | Fechtel | ........................ | 375/260 |
| 2009/0135923 A1 * | 5/2009 | Arambepola et al. | ......... | 375/260 |
| 2009/0180558 A1 | 7/2009 | Ma | | |
| 2010/0009649 A1 * | 1/2010 | Huebner et al. | .............. | 455/334 |
| 2010/0074348 A1 | 3/2010 | Xu | | |
| 2010/0215090 A1 * | 8/2010 | Kroeger et al. | ............... | 375/231 |

(Continued)

FOREIGN PATENT DOCUMENTS

EP 2259516 A2 12/2010

OTHER PUBLICATIONS

International Search Report with Written Opinion corresponding to PCT/US2011/059925, dated May 8, 2012, 9 pages.

*Primary Examiner* — Shuwang Liu
*Assistant Examiner* — David S Huang
(74) *Attorney, Agent, or Firm* — Pillsbury Winthrop Shaw Pittman LLP

(57) ABSTRACT

According to various embodiments, a method is disclosed that includes receiving an orthogonal frequency-division multiplexing (OFDM) modulated signal at a modulator; filtering the received modulated signal using a plurality of sets of filter coefficients with a linear predictor algorithm; and estimating a channel frequency response based on the filtering.

20 Claims, 4 Drawing Sheets

(56) References Cited

U.S. PATENT DOCUMENTS

| | | | |
|---|---|---|---|
| 2010/0303165 A1* | 12/2010 | Gore et al. | 375/260 |
| 2010/0309383 A1* | 12/2010 | Matsumura et al. | 348/725 |
| 2010/0309388 A1* | 12/2010 | Kang et al. | 348/732 |
| 2010/0310016 A1* | 12/2010 | Okehie et al. | 375/340 |
| 2011/0153705 A1* | 6/2011 | Kuo et al. | 708/313 |

* cited by examiner

CHANNEL ESTIMATION FOR DVB-T2 DEMODULATION USING AN ADAPTIVE PREDICTION TECHNIQUE

FIELD

This disclosure relates generally to wireless communication and, more particularly, to channel estimation techniques for use in multicarrier wireless systems.

BACKGROUND

DVB-T (Terrestrial Digital Video Broadcasting) is the digital terrestrial television standard adopted by Europe and many other countries. A very important operation in a mobile DVB-T digital terrestrial television demodulator is the estimation of the time-varying channel. If this can be done accurately, then other functions like equalization and inter-carrier-interference cancellation are made simpler.

DVB is the European consortium standard for the broadcast transmission of digital terrestrial television. DVB systems transmit a compressed digital audio/video stream, using multi-carrier modulation, such as orthogonal frequency division multiplexing (OFDM).

DVB-T broadcasters transmit data with a compressed digital audio-video stream using a process based on a Moving Picture Expert Group (MPEG)-2 standard. These transmissions can include all kinds of digital broadcasting, including high definition television (HDTV). MPEG-2 signals represent an improvement over the older analog signals, which require separate streams of transmission.

By way of background, in multi-carrier systems, such as OFDM systems, serially-inputted symbol streams are divided into unit blocks. The symbol streams of each unit block are converted into N number of parallel symbols. After the conversion, these symbols, which include data, are multiplexed and added by using a plurality of subcarriers having different frequencies, respectively, according to an Inverse Fast Fourier Transform (IFFT) technique, and are transmitted via the channel in time domain.

In addition to data, these OFDM symbols also include scattered pilot carriers (SPC), continuous pilot carriers (CPC), and reserve tone pilot carriers. These pilot carriers (signals) are used for frame synchronization, frequency synchronization, time synchronization, channel estimation, transmission mode identification, and/or phase noise tracing. The data and the pilot carriers constitute the useful part of the OFDM symbol.

Once the OFDM symbols are captured on a receiver side of the OFDM system, they must be demodulated. OFDM demodulation procedures include, for example, a Fast Fourier Transform (FFT) step, an equalizing and de-interleaving step, and a synchronizing step, among others.

Synchronization of OFDM receivers is performed to locate the useful part of each symbol to which the FFT is to be applied. This synchronization, generally performed in the time domain, can be characterized as coarse synchronization (e.g., initially performed during an acquisition period) and fine synchronization. Fine synchronization improves upon the results achieved during coarse synchronization enough to provide reliable demodulation. Time domain correlation is used to achieve initial symbol timing synchronization.

DVB-T2 is the second generation DVB Digital Terrestrial Television standard that has recently undergone standardization. This is OFDM-based and has FFT sizes up to and including 32K. One problem in DVB-T2 demodulation is equalization, and in particular, accurately estimating the channel frequency response. Once the channel frequency response is known, the equalization may be carried out using known MMSE algorithms. Furthermore, from the channel frequency response, the channel impulse response can be calculated and this may be used for symbol timing recovery. The conventional method given in DVB-T2 Implementation Guidelines is temporal interpolation of scattered pilots. In fact, the DVB-T2 standard has specifically introduced symbols like the preamble symbol P2 and the frame closing symbol with additional pilots to facilitate this temporal interpolation at the beginning and end of frames.

Temporal interpolation does not by itself give a good channel estimate in noisy conditions. It is necessary to create a low-pass temporal filter to get a good enough channel estimate. Temporal interpolation and temporal filtering are simple to implement but are very expensive in memory utilization. This is because these operations have to be implemented in the time dimension. The symbols may be as big as 32K in the frequency dimension and to implement a temporal filter several symbols have to be stored. Channel estimates are known at scattered pilot locations. These estimates have to be interpolated (or rather low-pass filtered) to get the channel estimates at data carrier locations. So to get the channel response for symbol n it is necessary to wait for symbols (n+1), (n+2), (n+3) etc. to arrive. Since the symbols are long, this implies a significant storage requirement in the demodulator. This translates to a significant die size cost and it is known that OFDM based digital TV demodulators are dominated by memory.

DETAILED DESCRIPTION

Summary

Figure 1:
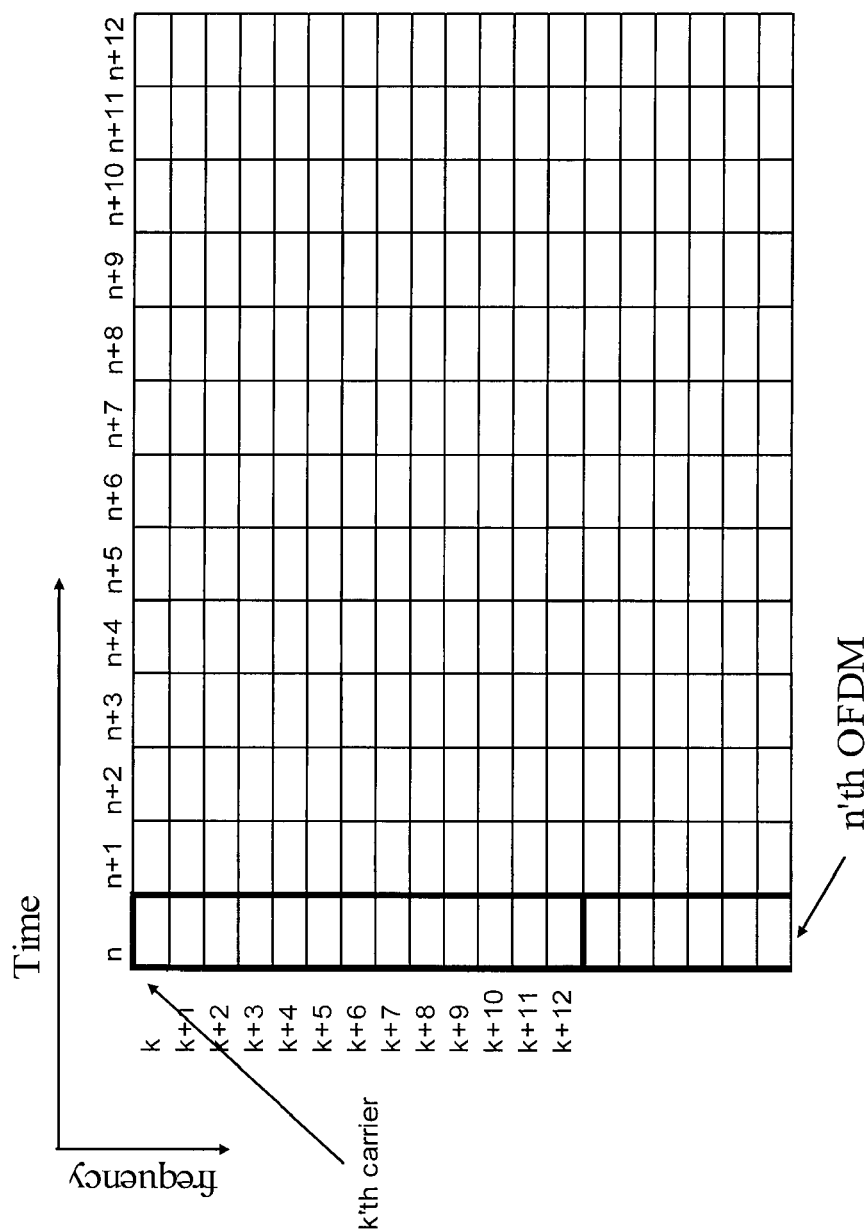
FIG. 1 is a timing diagram illustrating an arrangement of scattered pilots within a progression of OFDM symbols in accordance with various aspects of the present disclosure.

In accordance with various aspects of the present disclose, a method is disclosed that includes receiving an orthogonal frequency-division multiplexing (OFDM) modulated signal at a demodulator; filtering the received modulated signal using a plurality of sets of filter coefficients with a linear predictor algorithm; and estimating a channel frequency response based on the filtering.

The method can also include applying a Fourier transform to the received signal to extract one or more pilot carriers for one or more frequency carriers. The filtering can performed using a finite impulse response (FIR) filter. The method can also include storing a plurality of past pilot carriers for a particular frequency carrier in a memory; determining if a current pilot carrier for the particular frequency carrier and the stored plurality of pilot carriers are uniformly spaced in time; and choosing an appropriate set of filter coefficients of the plurality of sets of filter coefficients to be used with the linear prediction algorithm based on the determined uniformity of the past pilot carriers and the current pilot carrier.

The method can also include applying the chosen set of filter coefficients to all pilot carriers in a given OFDM symbol in which a common time uniformity condition is associated. The method can also include estimating a value for the current pilot carrier based on the chosen set of filter coefficients and the linear prediction algorithm. The method can also include multiplying the chosen set of filter coefficients element-wise with the stored values of the past pilot carriers; and summing the multiplied product to obtain a predicted value for the current pilot carrier. The method can also include determining a prediction error based on an estimated value of the current pilot carrier and the predicted value. The estimated values can be calculated using the known modulation of the pilots of current symbol to cancel any modulation from the current symbol pilot locations.

The method can also include updating the set of filter coefficients based on the determined prediction error. The updating can be performed once for each pilot location such that a number of updates are performed during an OFDM symbol, wherein the number is the same as the number of pilot locations in the OFDM symbol. The updating can also be performed once for an OFDM symbol, wherein the update contributions for each pilot location are averaged and the average contribution is used to update the filter coefficients only once.

The method can also include interpolating a value of one or more data carriers in the received signal based on the predicted value of the one or more pilot carriers. The method can also include removing one or more frame start symbols from the received signal, wherein the removal of the frame start symbols results in a time discontinuity within a prediction time line covering stored and current the pilot carriers.

In accordance with various aspects of the present disclosure, there can be N+1 different sets of filter coefficients to be used with N+1 uniformity conditions for a $N^{th}$ order liner prediction filter. In some aspects, the linear prediction algorithm can include a normalized least mean square algorithm.

In some aspects, after applying the FFT, all the scattered pilots (SPs) are extracted for a particular OFDM symbol. The OFDM symbol, in the frequency domain (i.e., after FFT), has a lot of sub carriers (up to 28K in the largest DVB-T2 mode). Out of those carriers, SPs are spaced regularly, for example every $12^{th}$ as in the example discussed in FIG. 1 below. So, there can be thousands of scattered pilots in a given OFDM symbol.

In some aspects, all scattered pilots in the currently symbol is also processed. All the pilots will have their histories saved into memory. When the stored pilot carriers and current pilot have uniform time lines, this uniform condition is true for all the pilots in the current symbol. Thus, all the pilots in a given symbol, along with their stored past values, will have the same uniformity condition associated with it. The nature of the uniformity only changes from one OFDM symbol to the next.

In accordance with various aspect of the present disclosure, a method is disclosed that includes receiving a terrestrial digital video broadcasting (DVB-T2) signal from a wireless channel, said DVB-T2 signal having a plurality of scattered pilots distributed in frequency bins thereof; extracting a plurality of scattered pilots from said DVB-T2 signal; storing the plurality of scattered pilots in a memory; filtering the received signal using a plurality of sets of filter coefficients with a linear predictor algorithm; determining a set of filter coefficients to be used with the linear predictor algorithm based on a sampling time history of the scattered pilots; and estimating a channel frequency response based on the filtering.

The method can also include estimating a value for the current pilot carrier based on the chosen set of filter coefficients and the linear prediction algorithm.

In accordance with various aspects of the present disclosure, a device is disclosed that includes a receiver configured to receive an orthogonal frequency-division multiplexing (OFDM) modulated signal; and a filter configured to filter the received modulated signal using a plurality of sets of filter coefficients with a linear predictor algorithm; and an channel frequency response module configured to estimate a channel frequency response based on the filtered signal.

The device can also include an estimating module configured to estimate a value for a current pilot carrier based on the chosen set of filter coefficients, the linear prediction algorithm and a plurality of previous pilot values.

Description

Aspects of the present disclosure relates to techniques for estimating a time-varying channel in a DVB-T system that do not require the large memories necessary to implement time filtering approaches. In accordance with various aspects of the present disclosure, channel prediction is used for demodulation. In this method, from the saved history of the time-varying channel, the channel frequency response can be predicted for symbol n. As a result, the channel response for symbol n can be known at the same time as the arrival of symbol n. Therefore, it is not necessary to store any data symbols to do the equalization, just enough memory to store the history of the channel (i.e. past scattered pilots), which is significantly smaller than storing data symbols. The linear predictors are adaptive and start from a unitary mapping and adapt themselves to the time-varying channel using the normalized least mean square (NLMS) algorithm.

DVB-T uses two types of pilot tones: continuous pilots and scattered pilots. Continuous pilots are somewhat randomly distributed and occur at the same frequency in each OFDM symbol. Scattered pilots are more structured. The techniques of the present disclosure use the scattered pilots.

FIG. 1 is a timing diagram illustrating the arrangement of scattered pilots within a progression of OFDM symbols in a typical DVB-T2 based system. In FIG. 1, each column represents the set of frequency carriers that together comprise a single OFDM symbol at a given time. For example, the OFDM symbol at time "n" is represented by the dotted vertical column shown in FIG. 1, where each element of the column is a distinct frequency component of the OFDM symbol. Then each of the columns denote successive OFDM symbols in time, and each row represents a distinct OFDM carrier frequency across time. For a contiguous set of OFDM symbols, the time between them is constant, so that in FIG. 1 a column of frequency carriers are uniformly spaced in the time direction. FIG. 1 depicts only 13 frequency carriers for each OFDM symbol, but in reality there could be up to 32 thousand, as specified in the DVB-T2 standard.

For the purposes of this explanation, there are two types of frequency carrier that make up an OFDM symbol. One type has a value that is known to the receiver, and these are referred to as pilot carriers. In FIG. 1, the pilot carriers are marked as gray. Note from the figure that the pilot carrier location from one OFDM symbol to the next is not the same, and is in fact staggered. Hence these pilots are more precisely referred to as scattered pilots, because their position in frequency can vary from one OFDM symbol to the next. But also note that a frequency position that is at some time a pilot will eventually be a pilot again, in that the staggered pilot pattern across time has a definite periodicity (this can be seen in FIG. 1). The other type of carrier, marked in white color in FIG. 1, is used to carry the information payload, and these carriers are referred to as data carriers. Hence a particular carrier position that is at some time a pilot, and will eventually be a pilot again, spends the intervening period being a data carrier.

Figure 2:
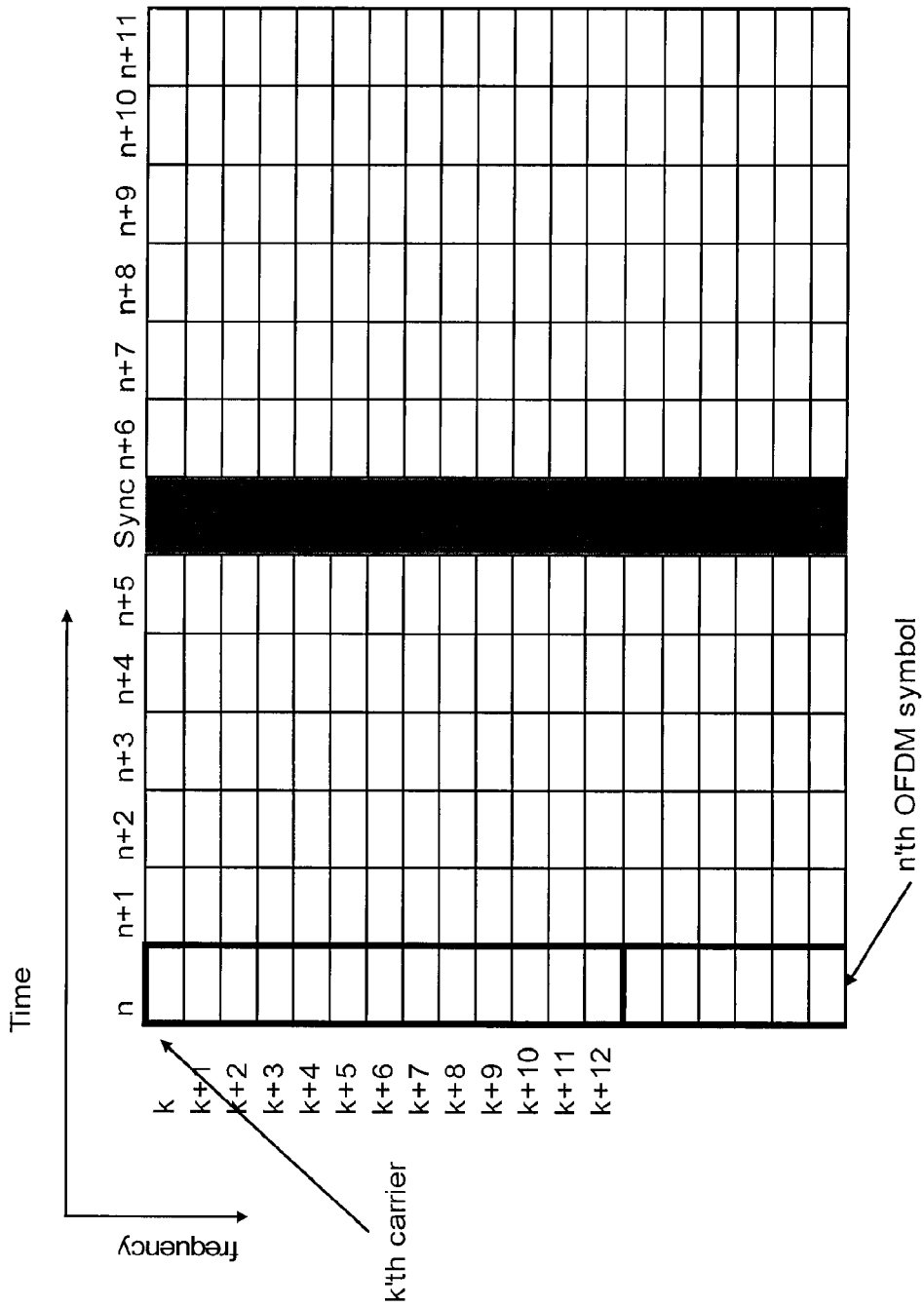
FIG. 2 is timing diagram illustrating an arrangement of scattered pilots within a progression of OFDM symbols having a time discontinuity to one or more frame start symbols in accordance with various aspects of the present disclosure.

FIG. 2 shows the discontinuity created by the frame-start OFDM symbols (at frame boundaries) as a gap (blacked out) in the time direction. The problem of using adaptive channel prediction for DVB-T2 is the discontinuities in the time axis at frame boundaries. The gap is a result of removal of certain frame-start symbols. One type of frame-start symbol in a DVB-T2 system is the P1 symbol, which is used to achieve frame synchronization and to identify the FFT size M used in the data symbols, and is fixed in size at 2K samples. This is a 1K OFDM symbol with two half-size guard bands. M may be any power of 2 from 1K to 32K. Almost all DVB-T2 systems will use 32K as this gives the highest capacity. The P1 symbol is followed by one or more P2 symbols of the FFT size M carrying signaling information plus data. These are followed by data symbols. The final symbol of the frame may be a frame closing symbol with a pilot structure different from the data symbols. The total number of symbols in the frame is signaled via P2. The frame length is subject to a limit of 250 ms, which means that for 32 k the maximum number of symbols is 68. Since the P1 symbol is significantly different in size to other symbols, this introduces a time discontinuity which does not allow the channel prediction technique to be used across frame boundaries. This also applies to P2 symbols, so that the P1 and P2 symbols together constitute a time discontinuity across which the channel prediction techniques cannot be used. These special OFDM symbols, used for purposes such as synchronization, will be referred to as frame-start symbols for convenience and cannot be used in the prediction process.

Aspects of the present disclosure involves using a particular channel prediction technique for OFDM symbols that are uniformly spaced in time, as shown in FIG. 1, and another channel prediction technique for those symbols that are not uniformly spaced in time, as shown in FIG. 2. The first scenario occurs at the middle or end of a frame. The second scenario occurs at the time discontinuity created by the frame-start OFDM symbols at the frame boundaries.

The prediction algorithm takes, as its input, the pilot carriers only. The algorithm or prediction filter, which is essentially a finite input response (FIR)-type of filter having a delay line register which holds the values of pilot carriers over time. Each carrier position that is at some time a pilot will have its own unique delay line register associated with it, and this register holds previous pilot values for that carrier position only. The time spacing between the values held in the delay line will be the corresponding time interval between the occurrences of the pilots. For example, from FIG. 1, the time interval between values held in the delay line will be two OFDM symbols, and for each row that contains a pilot there is a unique delay line associated with it.

All delay lines have the same length, and for discussion purposes assume this length is 4. From FIG. 1, take carrier k as an example and assume that we are at symbol time n+8, where this carrier location has, at this time, a pilot. The pilot values for carrier k at symbol times n+6, n+4, n+2, and n are stored in a delay line. The prediction algorithm now calculates (i.e. predicts), using only these previous pilot values stored in the delay line, what the value for the current pilot at time n+8 should be.

In the 4-element example there are thus three possible discontinuity patters for the delay-line. The prediction algorithm, as previously mentioned, can still be used, but if the delay-line contains a discontinuity then the tap-coefficients that were used in scenario 1 for the case of uniformly spaced elements cannot be used. Instead, a separate set of tap-coefficients is used for each possible discontinuity pattern. Hence for the 4-element example, four sets of tap coefficients are used, one for scenario 1 and three for the three possible discontinuity patters. In addition, one more set is used, making five in total, to deal with the case when all elements of the delay line originate from the previous frame (so they are uniformly spaced), but the prediction is for the current frame (i.e. this is the first usable OFDM symbol in the current frame), which thus means the forward-prediction must span the time duration of the frame-start symbols.

Turning to FIG. 2, take carrier k at symbol n+8 as an example. The pilot values at symbol times n+6, n+4, n+2, and n are stored in the delay-line memory. The predictor uses these stored values to predict the pilot at symbol time n+8. However, now the time line covering the data window is not uniform, because it has a discontinuity between elements n+4 and n+6 due to the presence of the frame-start symbols. Hence the filter or tap coefficients used to produce the prediction are different from those used in the uniformly sampled example of FIG. 1, and are unique for this particular discontinuity pattern in the delay line. The same set of tap coefficients are used for all delay-lines which have the same discontinuity pattern in their respective elements.

Figure 3:
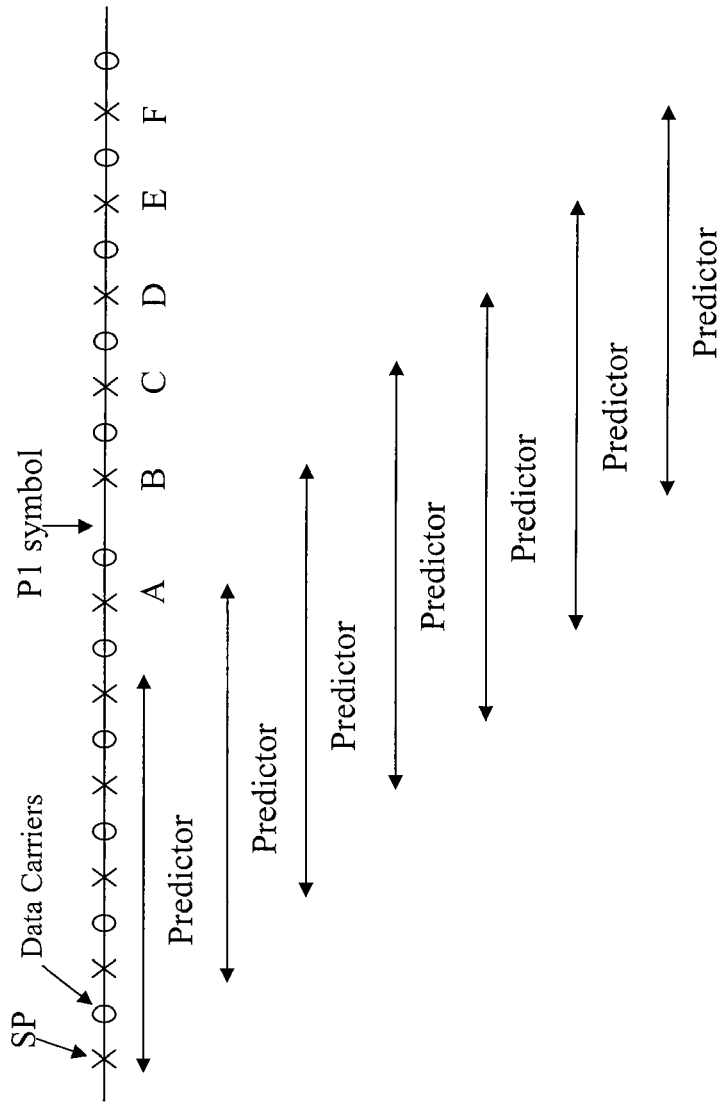
FIG. 3 shows one row of FIG. 2.

In the pilot pattern PP2 of DVB-T2 as shown in FIG. 1, there is a scattered pilot (SP) as the every 12th carrier of each data symbol. In the time dimension the pilot pattern repeats with periodicity 2. There are several other SP patterns in DVB-T2, but to illustrate the algorithm only PP2 is used for simplicity. For example, in the pilot pattern PP1 the periodicity in the time dimension is four. In this example, one Scattered Pilot (SP) carrier location in the frequency dimension is focused on and its changes tracked along the time dimension. Thus the linear prediction approach in the temporal dimension for this SP is described using FIG. 3. This line of sample values shown is just one horizontal row with an SP of FIG. 1. Although the time series for one SP location in FIG. 3 is shown, the same prediction technique is used for the time series associated with all SP locations. These use a four-tap predictor for illustration purposes (to reduce the sizes of the figures). The time discontinuity shown in FIG. 3 has been caused by the P1 symbol. The P1 symbol is 1K OFDM (but has 2K samples in the time domain to help with frame synchronization). Hence this symbol is shorter in duration compared to other symbols which may be up to 32K OFDM. After frame synchronization the P1 symbol is deleted. This extends the time period between the last symbol of frame (m−1) and the first symbol of frame (m) by 2K samples. This means that the time axis shown in FIG. 3 is not uniformly sampled. Note that the DVB-T2 frames are relatively small being no more than 250 ms in duration, so these time discontinuities occur frequently along the time axis. Referring to FIG. 3, let us begin from the region before the discontinuity in which the window that encompasses five SPs is within the uniformly-sampled region of the time axis. In some aspects, a 4-tap linear predictor, $\{a(i), i=1, 2, 3, 4\}$, is used in this region. The prediction is then given by equation (1).

$$\hat{x}(2n) = \sum_{i=1}^{N} a(i)x(2n-2i) \quad (1)$$

In the above equation N is set to 4 for a 4-tap predictor. Here x(i) are the past scattered pilots saved in memory. The factor of 2 is used in the indices to illustrate the fact that such scattered pilots occur once every two symbols. In equation (1) $\hat{x}(2n)$ is the predicted value for the SP of the $(2n)^{th}$ symbol and a(i) are the predictor tap weights or filter coefficients. These coefficients are not static but are self-adaptive to meet the channel characteristics. Note also that everything including the tap weights in equation (1) are complex numbers. The predictor is initialized for unitary transformation and it is made to adapt using the normalized LMS algorithm to track time variations of the channel. The predicted channel estimate for symbol (2n) is determined after we receive symbol (2n−2). So when the next symbol (2n−1) arrives, the estimates for $\hat{x}(2n-2)$ and $\hat{x}(2n)$ will be determined. So the channel estimate for symbol (2n−1) is worked out as:

$$\hat{x}(2n-1) = (\hat{x}(2n-2) + \hat{x}(2n))/2 \quad (2)$$

Equation (2) is only applicable when the interpolation is done between pilots in the same DVB-T2 frame. When the pilots contributing to interpolation come from two separate frames, which can happen at frame boundaries, we can have a more general interpolation equation as follows.

$$\hat{x}(2n-1) = (\beta \hat{x}(2n-2) + \gamma \hat{x}(2n))/(\beta+\gamma) \quad (3)$$

where β and γ are defined to produce a linearly interpolated channel response value at location 2n−1, based on predicted values at locations (2n−2) and 2n.

When symbol 2n arrives, the received SP value x(2n) will be known. Hence the prediction error can be worked out as:

$$\epsilon = x(2n) - \hat{x}(2n) \quad (4)$$

The prediction error, for carrier location k, is the difference between this predicted pilot value and the estimated pilot value. The estimated value is based on the received actual pilot value, which tends to be noisy due the noise and attenuation of the channel. This error is similarly calculated for all pilot locations at symbol time n+8. In FIG. 1, these would be the carrier locations k, k+12, k+24. As has been stated, each row in FIG. 1 that contains a pilot has its own unique delay line. However, the tap coefficients which are used to multiply the delay-line elements (and thence produce the predicted value) are common to all delay-lines having the same spacing between their samples.

Also note that the scattered pilot x(2n) is very noisy and that the linear predictive filter also acts as a noise filtering operator. So for symbol 2n, the predicted value $\hat{x}(2n)$ is used and not the received value x(2n) as the channel estimate. This prediction error of equation (4) is used to update the tap weights as shown in equation (5). This has been derived from the normalized least mean square (NLMS) algorithm.

$$a(i) \Leftarrow (1-\alpha)a(i) + \mu \times \frac{x(2n-2i)^*}{P_x} \epsilon \quad (5)$$

for i=1, 2, ..., N and where $$P_x = \sum_{i=1}^{N} |x(2n-2i)|^2 \quad (6)$$

In equation (5) α is a very small number that defines the tap leakage and μ is step size or the adaptation gain which will discussed further below. In some aspects, the division operation can be implemented as a binary shift operation and can be approximated by dividing by the power of 2 nearest to the divisor.

It can be shown that the same tap weights can be used for all carriers (with SPs) in the frequency dimension. Hence the linear prediction of equation (1) can be carried out for every SP of the symbol using the same set of tap weights {a(i), i=1, 2, 3, 4}. Furthermore, these tap weights can be updated using equation (5) after each SP of the symbol. Hence for every received symbol, equations (1), (4), (5) and (6) will be implemented for every SP location of that symbol using the same set of coefficients. If the process is begun at the beginning of the symbol, the taps weights will be updated for subsequent SP locations of the symbol. It is not always necessary to update the taps after every SP location. It is possible to save computations by just doing one update per symbol by combining the error values ε of all the SPs of the symbol, as given by equation (7).

$$a(i) \Leftarrow (1-\alpha)a(i) + \mu \times \text{mean}\left(\frac{x(2n-2i)^*}{P_x} \epsilon\right) \quad (7)$$

The function mean in the above equation is worked out over all the SPs of the symbols. The tap coefficient update can occur more or less frequently (once per symbol) depending on the particular constraints of the system. The mean value in equation (7) has a high SNR because the mean has been taken over many scattered pilots in the symbol. Therefore it is possible to use a relatively high adaptation gain μ (even as large as 1.0). Therefore, although the tap updates are done less frequently (once per symbol) these are done with a higher gain, which helps to keep the convergence rate up. Other intermediate tap update strategies can be used. For example, equation (7) may be implemented twice a symbol or four times a symbol. It will be seen that when there are discontinuities along the time axis more rapid tap update may be necessary and hence the tap coefficients may be updated at the highest rate of once per carrier as per equation (5).

Consider the discontinuity in the time axis caused by the effective deletion of the P1 symbol, shown in FIG. 3. Before this discontinuity the sampling is uniform, i.e. the sample period is a constant. When the P1 symbol is removed the sample period is increased, but only at the frame boundary, as seen from FIG. 3. Since frame period is relatively short, this sample period stretching repeats relatively frequently, say, once every few hundred ms. So this is not a uniformly sampled signal in the time dimension. (In DVB-T2 the second preamble symbol P2 and the frame closing symbol have been designed with a significant number of extra pilots to enable the use of temporal interpolation within a DVB-T2 frame.)

Owing to discontinuity in the time axis, the linear predictor {a(i), i=1, 2, 3, 4} cannot be used across the frame boundary. The reason is that this predictor implicitly assumes that samples are uniformly spaced. Referring to FIG. 3, consider predicting the SP indicated by B. The distance AB is greater than the uniform spacing between other successive SPs. Hence a different predictor {b(i), i=1, 2, 3, 4} is used to predict B. Similarly another predictor {c(i), i=1, 2, 3, 4} is needed to predict the scattered C. Another predictor {d(i), i=1, 2, 3, 4} is used to predict D and another predictor {e(i), i=1, 2, 3, 4} is used to predict the scattered pilot E. Now consider predicting scattered pilot F. All the four preceding SPs needed to predict F are uniformly spaced. Hence, the predictor {a(i), i=1, 2, 3, 4} can be used to predict F and the scattered pilots after that until the end of the frame. So, a total of five predictors will be used in this case.

$\{a(i), i=1, 2, 3, 4\}$
$\{b(i), i=1, 2, 3, 4\}$
$\{c(i), i=1, 2, 3, 4\}$
$\{d(i), i=1, 2, 3, 4\}$
$\{e(i), i=1, 2, 3, 4\}$

The predictor $\{a(i), i=1, 2, 3, 4\}$ is used in the region of the time axis which is uniformly sampled. The moment the SP window of size 5 crosses the DVB-T2 frame boundary, a region of non-uniform sampling is entered. In that region, the other four predictors are needed. When the SP window emerges fully on the new DVB-T2 frame, the original predictor $\{a(i), i=1, 2, 3, 4\}$ can be used. So most of the time, the first set of adaptive prediction filter coefficients will be used. In the transition from one frame to another, the other four sets of coefficients will be used. Although for illustration a 4-tap predictor is discussed, the actual predictor will have a length of six. Therefore, six sets of additional coefficients will be needed to cover the transition region, making seven sets in total. The adaptation method of the tap sets $\{b(i)\}$, $\{c(i)\}$, $\{d(i)\}$ and $\{e(i)\}$ is the same as that described for $\{a(i)\}$. All but the first tap is initialized to zero, and set the first tap to unity. The tap set $\{b(i), i=1, 2, 3, 4\}$ is applicable to all the SPs in the symbol containing B, i.e. all the SPs in the vertical column containing B. The tap set $\{c(i), i=1, 2, 3, 4\}$ is applicable to all the SPs in the vertical column containing C. The tap set $\{d(i), i=1, 2, 3, 4\}$ is applicable to all the SPs in the vertical column containing D. The tap set $\{e(i), i=1, 2, 3, 4\}$ is applicable to all the SPs in the vertical column containing E. For these four sets of prediction taps it is best not do a single tap update per symbol since it could take a few frames for these taps to converge. Faster convergence for these prediction taps is preferred. Hence, these have to be adapted for each scattered pilot of the symbol, using equation (5). Since there are many SP locations per symbol, these will adapt quickly and well within the symbol period. In summary, for the sets of predictor taps in the transition region, tap adaptation is done more frequently in each symbol, ideally after predicting each SP. The method of estimating the channel frequency response via adaptive linear prediction in the temporal dimension has been described above. This involved the use of multiple adaptive predictors to cross the time discontinuities at frame boundaries, which is the main invention of this disclosure. This algorithm results in a significant saving in memory because, unlike temporal filtering, there is no need to save any data symbols. This does reduce the latency of processing as well, but this is not claimed as an advantage because latency is not an issue in broadcast television.

The process above can be followed by a filtering/interpolation function to obtain the channel frequency response at every data carrier location. This process is an intra-symbol operation and does not involve significant amounts of memory utilization. After the channel frequency response is determined, data symbol equalization can be performed using, for example, a zero-forcing or minimum mean-squared error (MMSE) algorithm, both of which are known. In some aspects, DVB-T2 involves multiple-input-single-output (MISO) mode to achieve performance gain in single frequency networks. In this instance, two channel estimates can be obtained using the processes discussed above. Then, the zero-forcing or MMSE algorithms may be used for MISO equalization.

Figure 4:
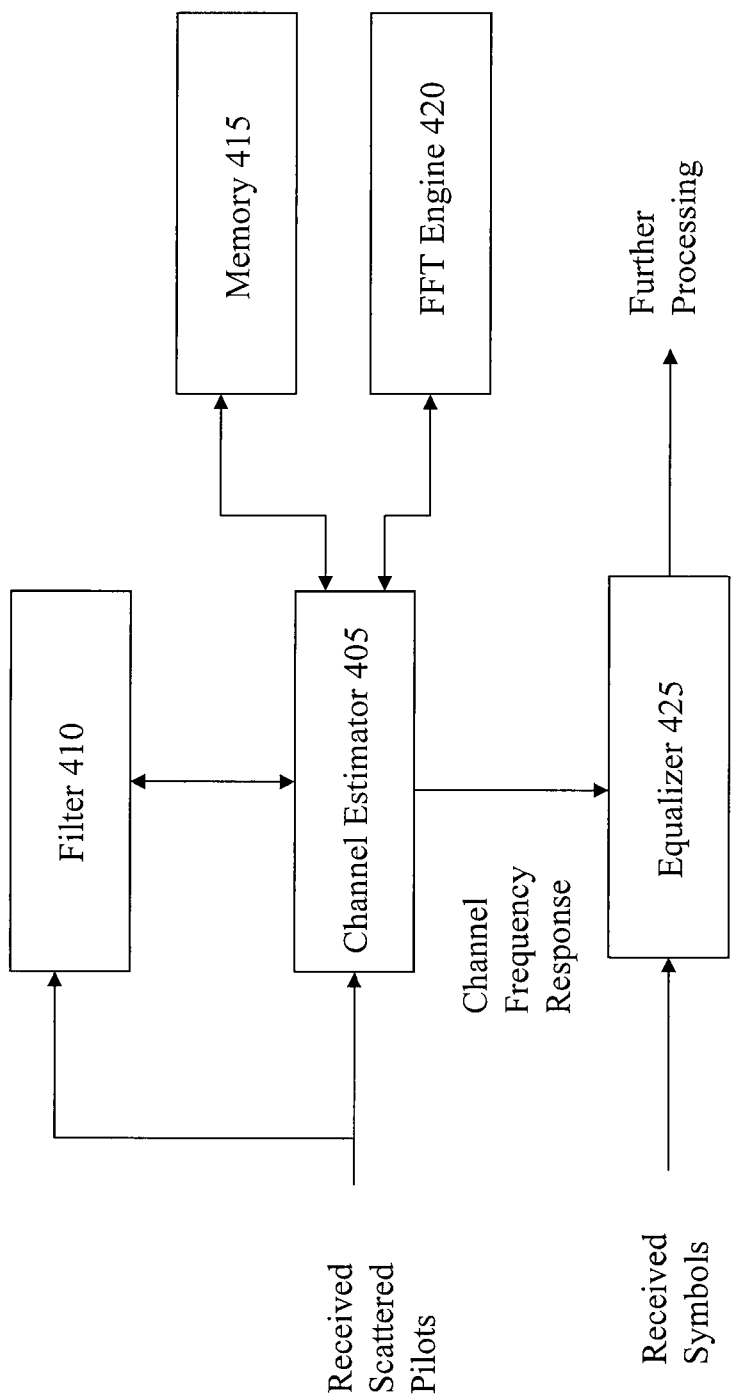
FIG. 4 is a block diagram illustrating signal processing functionality for use within a user device in a DVB-T2 system in accordance with various aspects of the present disclosure.

FIG. 4 is a block diagram illustrating signal processing functionality for use within a user device in a DVB-T2 system in accordance with embodiments of the present disclosure. As illustrated, the signal processing functionality includes: a channel estimator 405, an FFT engine 420, memory 415, an equalizer 425, and a filter 410. The channel estimator 405 is operative for developing an estimate of the wireless channel in the DVB-T2 system. The channel estimator 405 may be implemented within one or more digital processing devices such as, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. The equalizer 425 is operative for providing equalization for symbols received by the user device from the wireless channel. The equalized symbols may then be delivered to other circuitry for further processing. The equalizer 425 uses the channel estimate generated by the channel estimator 405 to perform the equalization.

The channel estimator 405 may develop the estimate of the wireless channel using the techniques discussed previously. The channel estimator 405 may use the FFT engine 420, the memory 415, and the filter 410 to carry out the channel estimation. The FFT engine 420 is operative for performing forward and/or inverse FFTs for the channel estimator 405. The FFT engine 420 may include one or more hardware FFT units to perform these services. Alternatively, the FFT engine 420 may be implemented in software within the same (or a different) digital processor as the channel estimator 405. The memory 415 is available for use by the channel estimator 405 for use in temporarily storing data and/or parameters during channel estimation procedures. The memory 415 may also be used by the filter 410 to store, for example, filter coefficients and/or other data or parameters. Any type of memory may be used. The filter 410 performs the filtering functions on the received scattered pilots. As described previously, the filter 410 may be a FIR filter. The filter 410 may be implemented in hardware and/or software. In at least one embodiment, the filter 410 is implemented in software within the same digital processing device as the channel estimator 405.

In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method comprising:
receiving an orthogonal frequency-division multiplexing (OFDM) modulated signal at a demodulator;
determining if a current pilot carrier of a carrier frequency of the modulated signal and a plurality of past pilot carriers of the carrier frequency are uniformly spaced in time or have a temporal discontinuity, wherein one of a plurality of sets of filter coefficients corresponds to uniform temporal spacing between the current pilot carrier and the past pilot carriers, and the remaining sets of filter coefficients each correspond to one of a plurality of temporal discontinuities between the current pilot carrier and the past pilot carriers;
responsive to said determining, filtering the received modulated signal using at least one of the plurality of sets of filter coefficients with a linear predictor algorithm; and
estimating a channel frequency response based on the filtering.

2. The method according to claim 1, further comprising applying a Fourier transform to the received signal to extract one or more pilot carriers for one or more frequency carriers.

3. The method according to claim 1, wherein the filtering includes a finite impulse response (FIR) filter.

4. The method according to claim 1, further comprising:
storing the plurality of past pilot carriers of the frequency carrier in a memory; and
choosing the at least one of a plurality of sets of filter coefficients that is unique to the determined temporal uniformity or to the determined temporal discontinuity between the current pilot carrier and the past pilot carriers.

5. The method according to claim 4, further comprising applying the chosen set of filter coefficients to all pilot carriers in a given OFDM symbol in which a common time uniformity condition is associated.

6. The method according to claim 5, further comprising estimating a value for the current pilot carrier based on the chosen set of filter coefficients and the linear prediction algorithm.

7. The method according to claim 6, further comprising:
multiplying the chosen set of filter coefficients element-wise with values of the past pilot carriers; and
summing the multiplied products to obtain a predicted value for the current pilot carrier.

8. The method according to claim 7, further comprising determining a prediction error based on an estimated value of the current pilot carrier and the predicted value.

9. The method according to claim 8, further comprising updating the set of filter coefficients based on the determined prediction error.

10. The method according to claim 9, wherein the updating is performed once for each pilot location such that a number of updates are performed during an OFDM symbol.

11. The method according to claim 10, wherein the number is the same as the number of pilot locations in the OFDM symbol.

12. The method according to claim 9, wherein the updating is performed once for an OFDM symbol, wherein the update contributions for each pilot location are averaged and the average contribution is used to update the filter coefficients only once.

13. The method according to claim 9, further comprising interpolating a value of one or more data carriers in the received signal based on the predicted value of the one or more pilot carriers.

14. The method according to claim 1, wherein said filtering comprising filtering using a $N^{th}$ order linear prediction filter, wherein for the $N^{th}$ order linear prediction filter, there are N+1 different sets of filter coefficients to be used with N+1 uniformity conditions.

15. The method according to claim 1, further comprising removing one or more frame start symbols from the received signal, wherein the removal of the frame start symbols results in a time discontinuity within a prediction time line covering stored and current pilot carriers.

16. The method of claim 1, wherein the linear prediction algorithm includes a normalized least mean square algorithm.

17. A method comprising:
receiving a terrestrial digital video broadcasting (DVB) signal from a wireless channel, said DVB signal having a plurality of scattered pilots distributed in frequency bins thereof;
extracting a plurality of scattered pilots from said DVB signal;
determining if a current scattered pilot of a particular frequency and a plurality of past scattered pilots of the particular frequency are uniformly spaced in time or have a temporal discontinuity, wherein one of the plurality of sets of filter coefficients corresponds to uniform spacing between the past scattered pilots and the current scattered pilot, and the remaining sets of filter coefficients each correspond to one of a plurality of temporal discontinuities between the past scattered pilots and the current scattered pilot;
responsive to said determining, filtering the received DVB signal using at least one of the plurality of sets of filter coefficients with a linear predictor algorithm; and
estimating a channel frequency response based on the filtering.

18. The method according to claim 17, further comprising: choosing the at least one of a plurality of sets of filter coefficients that is unique to the determined temporal uniformity or to the determined temporal discontinuity between the current scattered pilot and the past scattered pilots; and estimating a value for the current scattered pilot based on the chosen set of filter coefficients and the linear prediction algorithm.

19. A device comprising:
a receiver configured to receive an orthogonal frequency-division multiplexing (OFDM) modulated signal;
an estimation module configured to:
determine if a current pilot carrier of a carrier frequency of the modulated signal and a plurality of past pilot carriers of the carrier frequency are uniformly spaced in time or have a temporal discontinuity, wherein one of the plurality of sets of filter coefficients corresponds to uniform spacing between the past pilot carriers and the current pilot carrier, and the remaining sets of filter coefficients each correspond to one of a plurality of temporal discontinuities between the past pilot carriers and the current pilot carrier;
a filter configured to filter, responsive to said determination by the estimation module, the received modulated signal using at least one of the plurality of sets of filter coefficients with a linear predictor algorithm; and
a channel frequency response module configured to estimate a channel frequency response based on the filtered signal.

20. The device according to claim 19, wherein the estimation module is further configured to choose the at least one of a plurality of sets of filter coefficients that is unique to the determined temporal uniformity or to the determined temporal discontinuity between the current pilot carrier and the past pilot carriers, and estimate a value for the current pilot carrier based on the chosen set of filter coefficients, and the linear prediction algorithm.

* * * * *